US008516273B2

(12) United States Patent
Vijay et al.

(10) Patent No.: US 8,516,273 B2
(45) Date of Patent: Aug. 20, 2013

(54) PORTING DIGITAL RIGHTS MANAGEMENT SERVICE TO MULTIPLE COMPUTING PLATFORMS

(75) Inventors: Shyam S. Vijay, Fremont, CA (US); Joe Steele, Danville, CA (US); Roderick David Schultz, San Francisco, CA (US)

(73) Assignee: Asobe Systems Incorporated, San Jose, CA (US)

( * ) Notice: Subject to any disclaimer, the term of this patent is extended or adjusted under 35 U.S.C. 154(b) by 189 days.

(21) Appl. No.: 13/149,758

(22) Filed: May 31, 2011

(65) Prior Publication Data

US 2013/0166921 A1 Jun. 27, 2013

(51) Int. Cl.
*G06F 12/14* (2006.01)
*G06F 11/30* (2006.01)

(52) U.S. Cl.
USPC .......................................................... 713/191

(58) Field of Classification Search
USPC ...................................... 713/191; 705/54, 55
See application file for complete search history.

(56) References Cited

U.S. PATENT DOCUMENTS

| | | | | | |
|---|---|---|---|---|---|
| 6,070,198 | A | * | 5/2000 | Krause et al. | 719/321 |
| 6,594,707 | B1 | * | 7/2003 | Rubinstein et al. | 709/250 |
| 7,631,318 | B2 | | 12/2009 | Cottrille et al. | |
| 8,312,431 | B1 | * | 11/2012 | Moffat et al. | 717/126 |
| 2005/0005101 | A1 | * | 1/2005 | Yenduri | 713/164 |
| 2005/0074125 | A1 | * | 4/2005 | Chavanne et al. | 380/278 |
| 2005/0278791 | A1 | * | 12/2005 | Chu et al. | 726/26 |
| 2006/0036554 | A1 | | 2/2006 | Schrock et al. | |
| 2007/0094493 | A1 | * | 4/2007 | Ali et al. | 713/156 |
| 2009/0012805 | A1 | | 1/2009 | Schnell et al. | |
| 2009/0235361 | A1 | * | 9/2009 | Sloo et al. | 726/26 |
| 2009/0328234 | A1 | * | 12/2009 | Chou et al. | 726/27 |
| 2010/0042846 | A1 | * | 2/2010 | Trotter et al. | 713/182 |
| 2010/0177889 | A1 | * | 7/2010 | Koga | 380/28 |
| 2011/0222688 | A1 | * | 9/2011 | Graham et al. | 380/247 |
| 2011/0225420 | A1 | * | 9/2011 | Eigler et al. | 713/158 |
| 2012/0284193 | A1 | * | 11/2012 | Bharghavan et al. | 705/64 |

FOREIGN PATENT DOCUMENTS

WO 2004012059 2/2004

OTHER PUBLICATIONS

Gueron, Shay. "Intel® Advanced Encryption Standard (AES) New Instructions Set", May 2010.*
Various, "Microsoft CryptoAPI," Wikipedia, downloaded from the Internet on May 27, 2011, http://en.wikipedia.org/wiki/Microsoft_CryptoAPI, last modified Apr. 19, 2011, 3 pages.
Various, "POSIX," Wikipedia, downloaded from the Internet May 9, 2011, http://en.wikipedia.org/wiki/POSIX, last modified Apr. 16, 2011, 8 pages.

(Continued)

*Primary Examiner* — Michael Simitoski
(74) *Attorney, Agent, or Firm* — Wolfe-SBMC (57) ABSTRACT

Methods, systems, and apparatus, including computer programs encoded on a computer storage medium, for porting digital rights management services. In one aspect, a system includes: a hardware processor; one or more memory devices coupled with the hardware processor and effecting an operating system for the hardware processor; and a digital rights management (DRM) component having a DRM adaptor configured to check whether the hardware processor has a hardware-based encryption element, use the hardware-based encryption element if available, and use a software-based encryption element if the hardware-based encryption element is not available, wherein the software-based encryption element includes code compiled from source code for the hardware processor, the source code prepared for different computer platforms.

15 Claims, 6 Drawing Sheets

(56) References Cited

OTHER PUBLICATIONS

Apple Inc., "Mac OS X—Security Architecture," Jul. 13, 2010, downloaded from the Internet on May 27, 2011, http://developer.apple.com/library/ios/documentation/Security/Conceptual/Security_Overv . . . , Last updated Jul. 13, 2010, 11 pages.

Microsoft Coroporation, "Microsoft PlayReady Content Access Technology," Jul. 2008, Microsoft Corporation, 13 pages.

* cited by examiner

PORTING DIGITAL RIGHTS MANAGEMENT SERVICE TO MULTIPLE COMPUTING PLATFORMS

BACKGROUND

This specification relates to digital rights management.

Publishers, distributors, retailers and other providers of electronic content often desire to restrict access to the electronic content to authorized users only. Electronic content may include, for example, documents, e-books, video, music, computer applications, or games, to name a few examples. Electronic content may be usable on a variety of devices, such as a personal computer, laptop computer, tablet computer, television, set-top box, gaming system, and various types of mobile devices (e.g., personal digital assistant (PDA), portable music player, mobile phone). Electronic content may be distributed, for example, in some encrypted or otherwise protected form. Encrypted content may require a decryption key or other mechanism for rendering the document usable to an authorized user. Some types of user devices may include hardware that is specialized for certain encryption and decryption processing.

When electronic content is distributed, e.g., sold or lent to consumers, the electronic content can be protected by a digital rights management ("DRM") system. A DRM system defines and enforces digital rights. A digital right is a permission to perform one or more actions that involve a content item. By managing digital rights, the DRM system can allow content owners to prevent unauthorized use or distribution of the protected content and can selectively authorize users to perform actions that involve the protected content. For example, upon request, the DRM system can evaluate a set of digital rights associated with a content item, and based on the evaluation, provide or deny authorization for an action involving the content item.

SUMMARY

This specification describes technologies relating to porting digital rights management services.

In general, one innovative aspect of the subject matter described in this specification can be embodied in systems that include a hardware processor; one or more memory devices coupled with the hardware processor and effecting an operating system for the hardware processor; and a digital rights management (DRM) component having a DRM adaptor configured to check whether the hardware processor has a hardware-based encryption element, use the hardware-based encryption element if available, and use a software-based encryption element if the hardware-based encryption element is not available, wherein the software-based encryption element includes code compiled from source code for the hardware processor, the source code prepared for different computer platforms. Other embodiments of this aspect include corresponding apparatus, methods, and computer programs encoded on computer storage devices.

These and other embodiments can each optionally include one or more of the following features. The DRM adaptor can be configured to check availability for the hardware-based encryption element by requesting information from the operating system regarding a cryptographic program interface, and test acceptability of the cryptographic program interface based on the information. The cryptographic program interface can be supported by a dynamic library. The DRM adaptor can be configured to test acceptability of the cryptographic program interface by checking a digital signature.

The DRM adaptor can be configured to initiate a handshake with a loadable module using a number that is encrypted a first time, decrypted, modified, encrypted a second time using a different key from the first time, decrypted, and unmodified to produce a result comparable to the number. The source code can include source code that was obfuscated before compilation. The source code can include different libraries specific to the different computer platforms.

In general, one innovative aspect of the subject matter described in this specification can be embodied in methods that include the actions of: receiving information regarding different computing platforms for which a digital rights management (DRM) adaptor is buildable; obfuscating source code for the DRM adaptor, the source code being usable for each of the different computing platforms for which the DRM adaptor is buildable; compiling the obfuscated source code to generate the DRM adaptor that accesses different sets of cryptographic utilities on at least two of the different computing platforms for which the DRM adaptor is buildable; and providing the DRM adaptor to effect a DRM service on a target computing platform. Other embodiments of this aspect include corresponding systems, apparatus, and computer programs, configured to perform the actions of the methods, encoded on computer storage devices.

These and other embodiments can each optionally include one or more of the following features. The method can include: adding one or more hooks, into the DRM adaptor, to call into one or more programming interfaces of a hardware cryptographic capability of an identified hardware processor, the hardware cryptographic capability including one of the different sets of cryptographic utilities; and compiling additional source code to generate another of the different sets of cryptographic utilities, which is included in the DRM adaptor. Adding the one or more hooks can include adding respective different sets of one or more hooks into the DRM adaptor to call into respective programming interfaces of different hardware cryptographic capabilities of different identified hardware processors.

Compiling the additional source code can include compiling the additional source code multiple times for different computing platforms, based on an identified operating system, an identified hardware processor and an identified compiler for each respective computing platform, to generate at least two of the different sets of cryptographic utilities. In addition, the source code for the DRM adaptor can include code that implements encryption key handling guidelines for the DRM service.

In general, one innovative aspect of the subject matter described in this specification can be embodied in a computer storage medium encoded with a computer program, the program including instructions that when executed by data processing apparatus cause the data processing apparatus to perform operations including: checking whether a hardware processor has a hardware-based encryption element; using the hardware-based encryption element, if available, for cryptographic utilities calls into a digital rights management (DRM) adaptor; and using a software-based encryption element, if the hardware-based encryption element is not available, for the cryptographic utilities calls into the DRM adaptor, wherein the software-based encryption element includes code compiled from source code for the hardware processor, the source code prepared for different computer platforms. Other embodiments of this aspect include corresponding systems, apparatus, and methods.

These and other embodiments can each optionally include one or more of the following features. The operations can include: checking availability for the hardware-based encryption element by requesting information from an operating system regarding a cryptographic program interface; and testing acceptability of the cryptographic program interface based on the information from the operating system. The cryptographic program interface can be supported by a dynamic library. The testing can include checking a digital signature associated with the cryptographic program interface. The source code can include source code that was obfuscated before compilation, and the source code can include different libraries specific to the different computer platforms.

Particular embodiments of the subject matter described in this specification can be implemented so as to realize one or more of the following advantages. A software-based encryption element can be used if a hardware-based encryption element is not available. Secure, robust DRM functionality that is operating system and hardware independent can be used on multiple, different computing platforms. Secure, robust DRM functionality can be added to a new computing platform. DRM functionality can be added to a device without in-depth knowledge of DRM and without extensive effort by a device vendor or manufacturer. DRM-enabled applications can run on multiple, different computing platforms while using a same DRM component.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
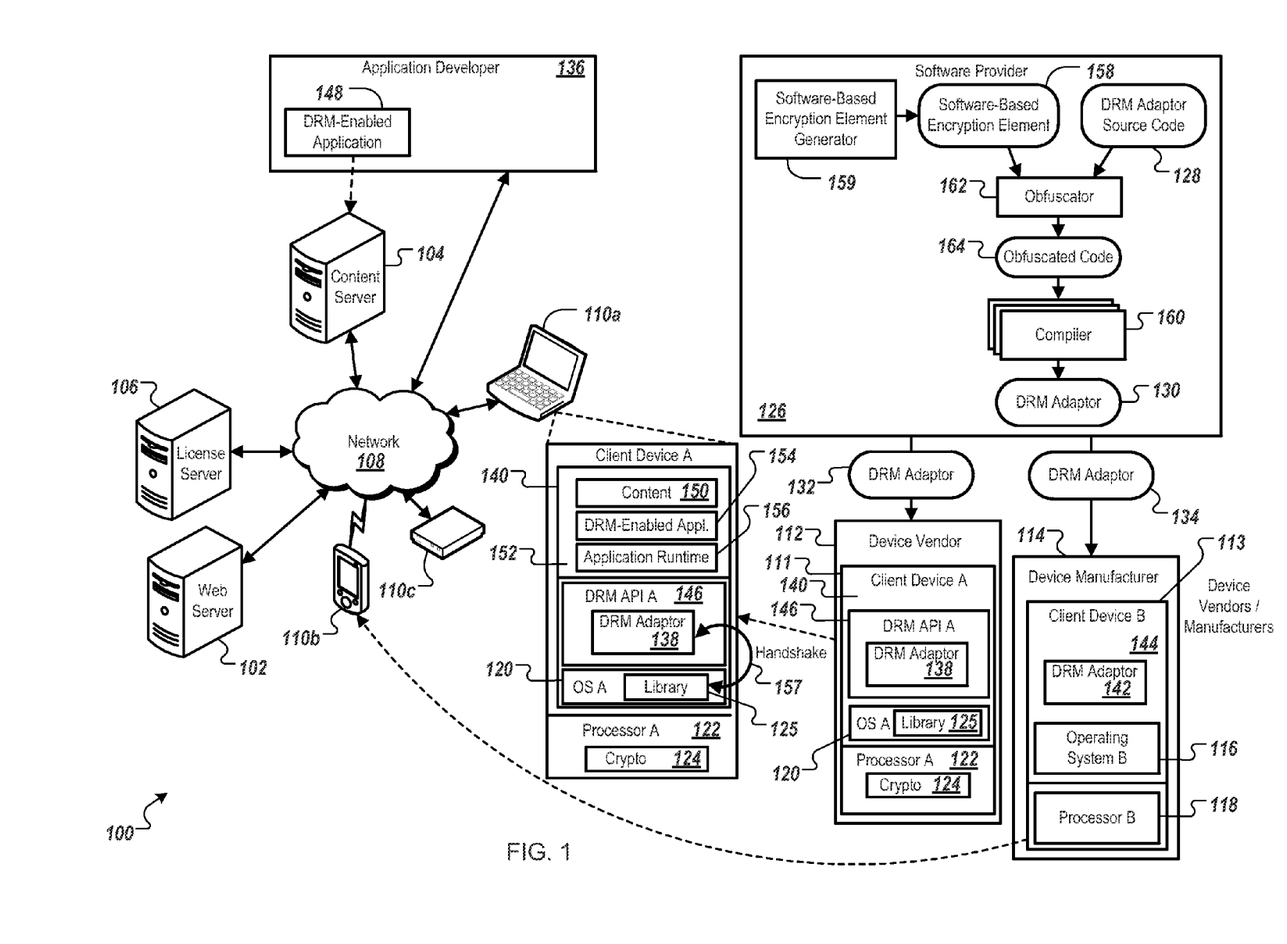
FIG. 1 is a block diagram showing a system in which digital rights management (DRM) services can be readily ported to new computing platforms.

FIG. 1 is a block diagram showing a system 100 in which digital rights management (DRM) services can be readily ported to new computing platforms. The system 100 includes one or more web servers 102, one or more content servers 104, and one or more license servers 106. Although only one of each of the servers 102, 104, and 106 is illustrated in FIG. 1 for convenience, the functionality of the servers 102, 104, and 106 can be distributed among multiple different servers. The web server 102, the content server 104, and the license server 106 can communicate through a network 108. The network 108 can include the Internet, one or more local area networks (LANs), one or more wireless networks, or any other network capable of supporting electronic communications. The web server 102, content server 104, and license server 106 can be accessed across the network 108 by client devices 110, e.g., personal computers 110a, mobile devices 110b, set-top boxes 110c or other devices, such as tablet computers or gaming consoles.

A client device 110a, 110b, or 110c can be provided by a device vendor or device manufacturer. For example, as illustrated by a client device 111, a device vendor 112 can provide the client device 110a, and as illustrated by a client device 113, a device manufacturer 114 can provide the client device 110b. The client device 111 or 113 represents the state of the client device 110a or 110b when provided to a user by the device vendor 112 or the device manufacturer 114, respectively. The device manufacturer 114 may be a "vertical" manufacturer in that the device manufacturer 114 may develop both an operating system 116 and a hardware processor 118 for the client device 113. The device vendor 112 may be a "horizontal" vendor in that the device vendor 112 may develop an operating system (OS) 120 for the client device 111 but not a hardware processor 122 for the client device 111, or may develop the hardware processor 122 but not the operating system 120, or may develop neither the operating system 120 nor the hardware processor 122 but may assemble the client device 111 using the operating system 120 and the hardware processor 122.

Some hardware processors can include DRM (Digital Rights Management)-specific functionality, such as one or more hardware encryption elements. For example, the hardware processor 122 includes a hardware encryption element 124 configured to perform a set of cryptographic utilities. Using the hardware-based encryption element 124 can result in faster performance, such as faster encryption and decryption, as compared to using software-based DRM utilities. The hardware encryption element 124 can be supported by a dynamic library 125. The dynamic library 125 can be included in or can be associated with the operating system 120.

A software provider 126 can develop DRM software which can provide secure, robust DRM functionality that can be made available on a variety of computing platforms, where a particular computing platform includes a particular operating system running on a particular hardware processor. For example, the software provider 126 can develop DRM adaptor source code 128 that is usable on a variety of computing platforms and can build a DRM adaptor 130 that is targeted for a particular computing platform, or multiple different computing platforms. The DRM adaptor 130 can be used by the device vendor 112 or the device manufacturer 114 to implement robust, secure DRM solutions on devices provided by the device vendor 112 or the device manufacturer 114. The DRM adaptor can be added to devices provided by the device vendor 112 or the device manufacturer 114 without requiring a large amount of knowledge or effort on the part of the device vendor 112 or the device manufacturer 114.

The DRM adaptor 130 can be configured to check whether a hardware processor has a hardware-based encryption element, use the hardware-based encryption element, if available, for cryptographic utilities calls, and use a software-based encryption element for the cryptographic utilities calls, if the hardware-based encryption element is not available. The DRM adaptor 130 can include other DRM solutions, such as secure storage of critical DRM data, such as keys, and a secure clock.

The software provider 126 can build a DRM adaptor 132 targeted for the operating system 120 and the hardware processor 122 used by the client device 111 and can build a DRM adaptor 134 targeted for the operating system 116 and the hardware processor 118 used by the client device 113. The device vendor 112 or the device manufacturer 114 can choose to distribute the DRM adaptor 132 or the DRM adaptor 134, when providing the client device 111 or the client device 113, respectively, to a user, such as to enable application developers (e.g., an application developer 136) to develop applications that include DRM functionality. For example, the DRM adaptor 132 may be provided as a DRM adaptor 138 included in computer readable medium 140 of the client device 111 and the DRM adaptor 134 may be provided as a DRM adaptor 142 included in computer readable medium 144 of the client device 113.

The device vendor 112 or the device manufacturer 114 can choose whether to expose, to the application developer 136, some or all of the functionality provided by the DRM adaptor 138 or the DRM adaptor 142, respectively. For example, the device vendor 112 may choose to expose some but not all of the functionality of the DRM adaptor 138 using a DRM API (Application Programming Interface) 146. As described in more detail below, the application developer 136 can develop an application 148 that uses DRM functionality provided by the DRM API 146. The application 148 can be used, for example, by a user of the client device 110a.

For example, a user of a client device 110a may browse content items (e.g., multimedia content) accessible from the web server 102. The web server 102 may, for example, be maintained by a retailer. The retailer may, for example, receive content from content owners or content distributors and may encode the received content. Content owners, content distributors, and the retailer may desire to restrict access to content to authorized users only and the retailer may encrypt a respective content item so that the content item can only be consumed by a user who has obtained a license for the content item. Metadata which specifies usage rules for the content item may be included with an encrypted version of the content item. The retailer may host content on the content server 104.

The user of the client device 110a may request a resource located on the web server 102 that corresponds to a particular content item. The user may, for example, enter or otherwise select (e.g., by clicking on a hyperlink) a URL (Uniform Resource Locator), corresponding to a resource located on the web server 102, into a web browser running on the client device 110a. In response to the request for the resource by the client device 110a, the web server 102 or the content server 104 can send a copy of the resource to the client device 110a. In some implementations, the resource can be sent using a content delivery network (CDN). The content associated with the resource can be, for example, a file that is sent to the client device 110a, or the content can be content that is streamed to the client device 110a. The content can be stored on the client device 110a as content 150 in a user area 152 of the computer readable medium 140.

The content server 104 or the web server 102 can provide the application 148 to present the content 150. The application developer 136, who may be a content owner, a content distributor, or a third party application developer, can, for example, make the application 148 available from the content server 104 or from the web server 102. The application 148 can provide a runtime environment for presenting video, audio, text, and/or other information. The application 148 can, for example, be included in one or more files that are separate from the content 150. For example, in some implementations, the web server 102 can provide a SWF file. Note that SWF is a file format, such as the SWF File Format Specification (Version 10) as published by Adobe Systems Incorporated of San Jose, Calif. As another example, the application 148 can be an Adobe® Integrated Runtime (AIR®) application.

The retailer associated with the web server 102 may desire that the content 150 be viewed using an application provided by the web server 102 or by the content server 104 and not some other application. For example, the application 148 provided by the web server 102 or content server 104 can be configured to present advertisements, gather user behavior data or analytics, or perform other functionality beneficial to the retailer associated with the web server 102 or beneficial to the content owner. Moreover, control of the application 148 used to present the content 150 can prevent third parties from deriving an unauthorized benefit from proprietary or otherwise protected (e.g., copyrighted) content.

In response to the request for the resource by the client device 110a, the web server 102 or the content server 104 can send a copy of the application 148 (e.g., a copy of a player file, such as a SWF file) to the client device 110a. The web server 102 can, for example, forward a request for the resource and/or the application 148 to the content server 104. The web server 102 or the content server 104 can send the copy of the application 148 to the client device 110a before, concurrently with, or after the sending of the content 150. The client device 110a can store the copy of the application 148 as an application 154.

The application 154 may be runnable using an application runtime 156. For example, the user may have previously installed the application runtime 156, or the application runtime 156 may be sent to the client device before, concurrently with, or after the sending of the content 150 or the application 154. The application runtime 156 may be, for example, a virtual machine that can execute the application 154 as well as other scripts or applications. The application runtime 156 may be, for example, a media player such as Adobe® Flash® Player software or may be the Adobe® Integrated Runtime (AIR®) software.

In some implementations, the resource or the corresponding content 150 can indicate that one or more licenses are needed to access (e.g., view or play) the content. In response to receiving the resource with such an indication or in response to the user attempting to access (e.g., view, play) the content 150, the client device 110a can request a license for the content 150 from the web server 102 or from the license server 106. In some implementations, the web server 102 can forward a request for a license to the license server 106 in response to the request for the resource from the client device 110a. In some implementations, a URL of the license server 106 can be included in metadata associated with the content 150.

In some implementations, the request for the license can be initiated by the application 154. The request for the license can include an identity of the application 154 and/or some other authorization information, such as a machine certificate associated with the application runtime 156 and the client device 110a. The license server 106 can validate the license request, can digitally sign or otherwise authenticate a license, and can send the license to the client device 110a. The license can be sent concurrently with the sending of the content 150 or before or after the sending of the content 150.

Before processing the license, the application 154 or the application runtime 156 can verify the license, such as by verifying a digital signature. The digital signature can be verified, for example, using one or more functions provided by the DRM API 146. A copy of the license can be stored in the client device 110a. The license can include a content identifier, an encryption key, and an authorization to present the content 150. In some implementations, the authorization to present the multimedia content 150 can include information to verify the application 154. The application runtime 156 can verify the application 154, such as by confirming that a signature associated with the application matches a signature included on a white list of applications, by confirming that the application was received from a trusted source, or by hashing an application file and confirming that a calculated hash value matches an expected hash value included in or with the license. The application runtime 156 can verify the application 154 using one or more functions provided by the DRM API 146.

The application 154 or the application runtime 156 can use an encryption key included in the license to decrypt the content 150. In general, the application 154 or the application runtime 156 can use decryption, hashing, and other DRM-related functionality provided by the DRM adaptor 138 through the DRM API 146. Using the DRM API 146 and DRM adaptor 138 can result in stronger security and faster development times for the application developer 136, as compared to the application developer 136 implementing DRM functionality from scratch.

The DRM adaptor 138 can use the hardware encryption element 124 for cryptographic utilities calls into the DRM adaptor 138. Before using the hardware encryption element 124, the DRM adaptor 138 (or the runtime 156) can verify the hardware encryption element 124. For example, the DRM adaptor 138 (or the runtime 156) can verify a digital signature associated with the dynamic library 125 that supports the hardware encryption element 124. As another example, as illustrated by an arrow 157, the DRM adaptor 138 (or the runtime 156) can perform a handshake process with the dynamic library 125.

For example, the DRM adaptor 138 can determine a cryptographic key to use for the dynamic library 125. The DRM adaptor 138 can generate a random number R and can encrypt R using the key to produce an encrypted random number R'. The DRM adaptor 138 can send the key and the encrypted random number R' to the dynamic library 125. The dynamic library 125 can decrypt the encrypted random number R' using the key (e.g., using the hardware encryption element 124) to produce a copy of the random number R. The dynamic library 125 can increment the copy of the random number R to produce a number R2. The dynamic library 125 can encrypt R2 using the key (e.g., using the hardware encryption element 124) to produce an encrypted number R2'. The dynamic library 125 can send the encrypted number R2' to the DRM adaptor 138. The DRM adaptor 138 candecrypt R2' using the key to produce R2. The DRM adaptor 138 can perform a test to determine whether R2=R+1. If the test is true, the DRM adaptor 138 can determine that the dynamic library 125 and the hardware encryption element 124 are available and valid. If the test is false, the DRM adaptor 138 can determine that the dynamic library 125 and/or the hardware encryption element 124 are not valid, and can use a software-based encryption element for cryptographic utilities calls into the DRM adaptor 138.

In some implementations, the actions attributed to the DRM adaptor 138 in the example above can be performed by the application runtime 156, or by the DRM adaptor 138 operating in concert with the application runtime 156. Further, the handshake 157 can be performed in additional situations. The verification handshake 157 can be performed for other loadable modules, for example, for any loadable module used to implement the hardware-based DRM adaptor functionality. In addition, variations on the handshake protocol 157 are also possible, such as using different operations (e.g., other than addition or subtraction) to modify R, adding additional information to avoid replay attacks, etc.

The DRM adaptor 130 can be built by the software provider 126 for a new computing platform. For example, suppose the client device 110c is a new computing device being developed by the device manufacturer 114. The software provider 126 can work with the device manufacturer 114 to build the DRM adaptor 130 so that the DRM adaptor 130 is targeted to the client device 110c. The device manufacturer 114 can communicate information about a target hardware processor and a target operating system for the client device 110c to the software provider 126.

The software provider 126 can discuss with the device manufacturer 114 whether the target hardware processor includes a hardware-based encryption element. If the target hardware processor does not include a hardware-based encryption element, the software provider 126 can generate a software-based encryption element 158 using a software-based encryption element generator 159. The software-based encryption element 158 can be specific to the targeted hardware processor, the targeted operating system, and a targeted compiler 160. The targeted compiler 160 can be identified from a set of possible compilers. In some implementations or for some build processes, the software provider 126 can generate the software-based encryption element 158 even if the targeted hardware processor includes a hardware-based encryption element. For example, the software-based encryption element 158 can be used as fallback functionality if, for example, the DRM adaptor 130 is unable to successfully communicate with the hardware-based encryption element in the field.

The DRM adaptor source code 128 can implement logic that includes determining, at run time, whether a hardware-based encryption element is available, using the hardware-based encryption element, if available, for cryptographic utilities, and using a software-based encryption element (such as the software-based encryption element 158), if a hardware-based encryption element is not available, for the cryptographic utilities. If the client device 110c includes a hardware-based encryption element, the software provider 126 and the device manufacturer 114 can identify a messaging interface and the software provider 126 may add one or more hooks to communicate with the target hardware processor for the client device 110c to a hardware abstraction component associated with (or in some implementations, included in) the DRM adaptor source code 128.

Continuing with the example of building the DRM adaptor 130 for the client device 110c, the software provider 126 can use an obfuscator 162 to obfuscate the DRM adaptor source code 128 to create obfuscated source code 164. Code may be obfuscated, for example, as a security measure. The software-based encryption element 158 can be source code, binary code, or a combination of source code and binary code. If the software-based encryption element 158 includes source code, that source code can be obfuscated using the obfuscator 162 and the obfuscated source code 164 can include obfuscated source code corresponding to both the DRM adaptor source code 128 and the software-based encryption element 158. If the software-based encryption element 158 does not include source code, the obfuscated source code 164 can correspond to the DRM adaptor source code 128. Some or all obfuscation can be performed manually, automatically, or by a combination of manual and automatic methods.

The software provider 126 can use the compiler 160 to compile the obfuscated source code 164 to generate the DRM adaptor 130. The DRM adaptor 130 can be, for example, a library that includes binary code that is configured to run on the client device 110c. The device manufacturer 114 can include the DRM adaptor 130 when distributing the client device 110c and the application developer 136 can develop applications using functionality provided by the DRM adaptor 130.

The DRM adaptor 130 can be built for use with multiple, different computing platforms. For example, in some implementations, the DRM adaptor 130 can be used both with a computing platform that includes a hardware processor that includes a hardware-based encryption element and with a computing platform that includes a hardware processor that does not include a hardware-based encryption element (e.g., in which case, the DRM adaptor 130 can include one or more software-based encryption elements). As another example, if the DRM adaptor 130 includes multiple software-based encryption elements, each of the multiple software-based encryption elements can be configured for use on one of multiple, different computing platforms. The DRM adaptor 130 can be used on each of the multiple, different computing platforms and at runtime can determine which of the multiple software-based encryption elements to use based on the current computing platform. In building the DRM adaptor 130, for example, multiple, different compilers can be used, one for each software-based encryption element that is targeted for a particular computing platform, and each of the compiler outputs from the multiple, different compilers can be included in or made accessible by the DRM adaptor 130, to enable the DRM adaptor 130 to run on each of the multiple, different computing platforms.

Figure 2:
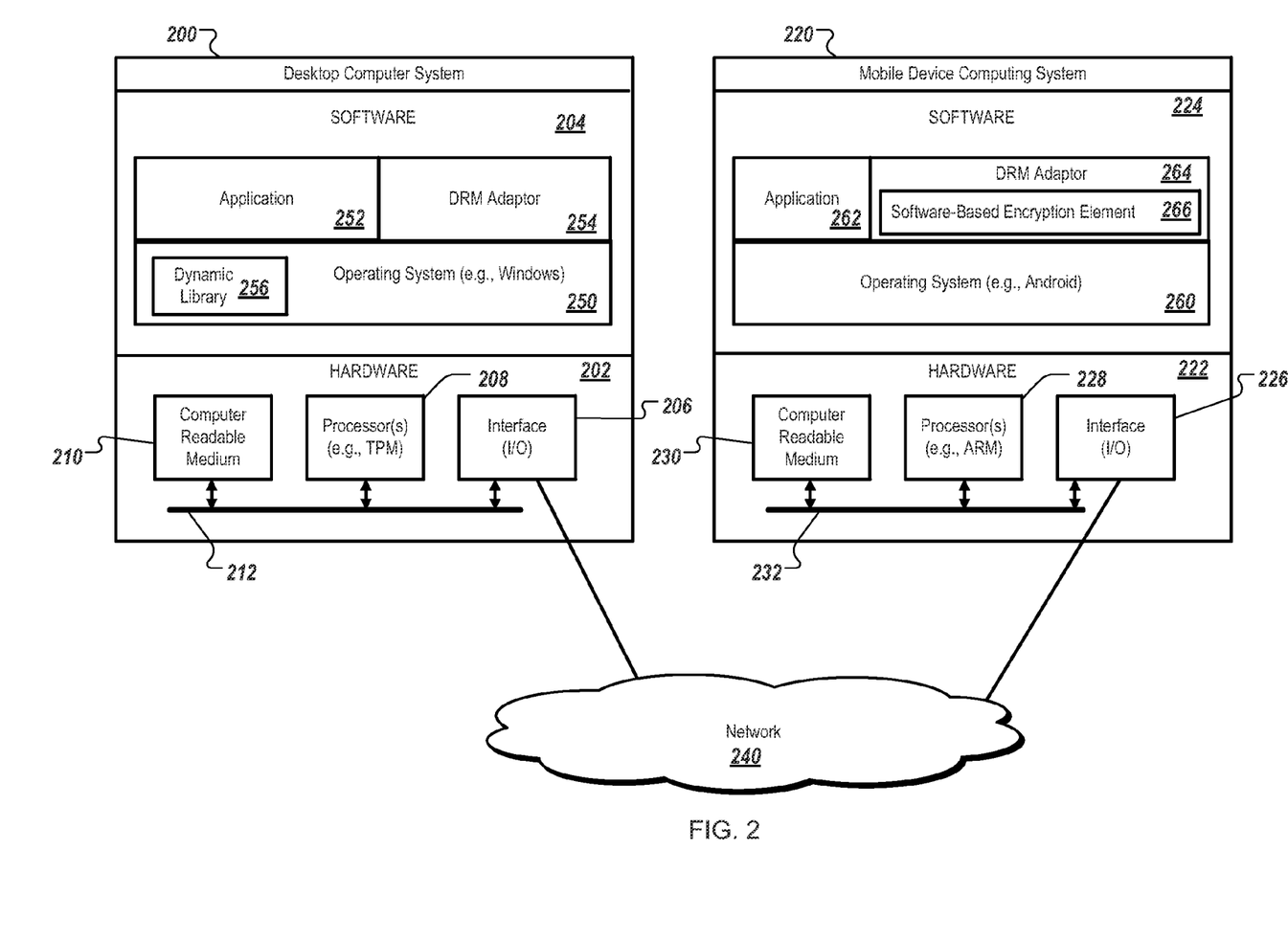
FIG. 2 is a block diagram showing details of computing platforms.

FIG. 2 is a block diagram showing details of computing platforms. A desktop computer system 200 includes hardware 202 and software 204. The hardware 202 includes an interface 206, a processing device 208, a computer-readable medium 210, and a system bus 212 to connect them, all of which can, in some implementations, be integrated on a single circuit board. Similarly, a mobile device computing system 220 includes hardware 222 and software 224. The hardware 222 includes an interface 226, a processing device 228, a computer-readable medium 230, and a system bus 232 to connect them, all of which can, in some implementations, be integrated on a single circuit board. Each of the hardware 202 and 222 can also include, for example, a display device.

Each of the system buses 212 and 232 can include multiple different types of busses, such as parallel or serial busses. Each of the computer-readable media 210 and 230 can include one or more non-volatile memories and storage devices (e.g., flash memory and a hard disk), one or more volatile memory devices (e.g., dynamic or static random access memory), or a combination of these. Each of the processing devices 208 and 228 can include one or more microprocessors and/or multicore processors. The processing device 208 and/or the processing device 222 can include a hardware-based encryption element (e.g., a secure cryptoprocessor) for performing cryptographic operations. Each of the interfaces 206 and 226 can include different types of interface circuitry and devices, such as a network card, or a radio frequency (RF) section and antenna, to connect to a network 240. Each of the interfaces 206 and 226 can also include other types of interface devices such as input/output (I/O) devices used to connect with other components, such as a keyboard, a cursor moving device, speaker(s), a microphone, and a digital camera, each of which can also be included in the hardware 202 or hardware 222, respectively.

The software 204 includes an operating system 250, an application 252, and a DRM adaptor 254. The operating system 250 includes a dynamic library 256, which can be used, for example, to support a hardware-based encryption element included in the processing device 208. The software 224 includes an operating system 260, an application 262, and a DRM adaptor 264. The DRM adaptor 264 includes or is associated with a software-based encryption element 266.

The DRM adaptor 254 can be built into the operating system 250, can run on top of the operating system 250 (as shown), or can run in a runtime environment that provides the DRM adaptor 254 with access to the functions provided by the operating system 250. Similarly, the DRM adaptor 264 can be built into the operating system 260, can run on top of the operating system 260 (as shown), or can run in a runtime environment that provides the DRM adaptor 264 with access to the functions provided by the operating system 260.

The DRM adaptor 254 and the DRM adaptor 264 can each be built from a same source code base. The DRM adaptor 254 can, for example, determine that the processing unit 208 includes a hardware-based encryption element and can use the hardware-based encryption element to perform one or more cryptographic operations, such as in response to one or more requests from the application 252. The DRM adaptor 264 can, for example, determine that the processing unit 228 does not include a hardware-based encryption element and can use the software-based encryption element 266 to perform one or more cryptographic operations, such as in response to one or more requests from the application 262.

Figure 3A:
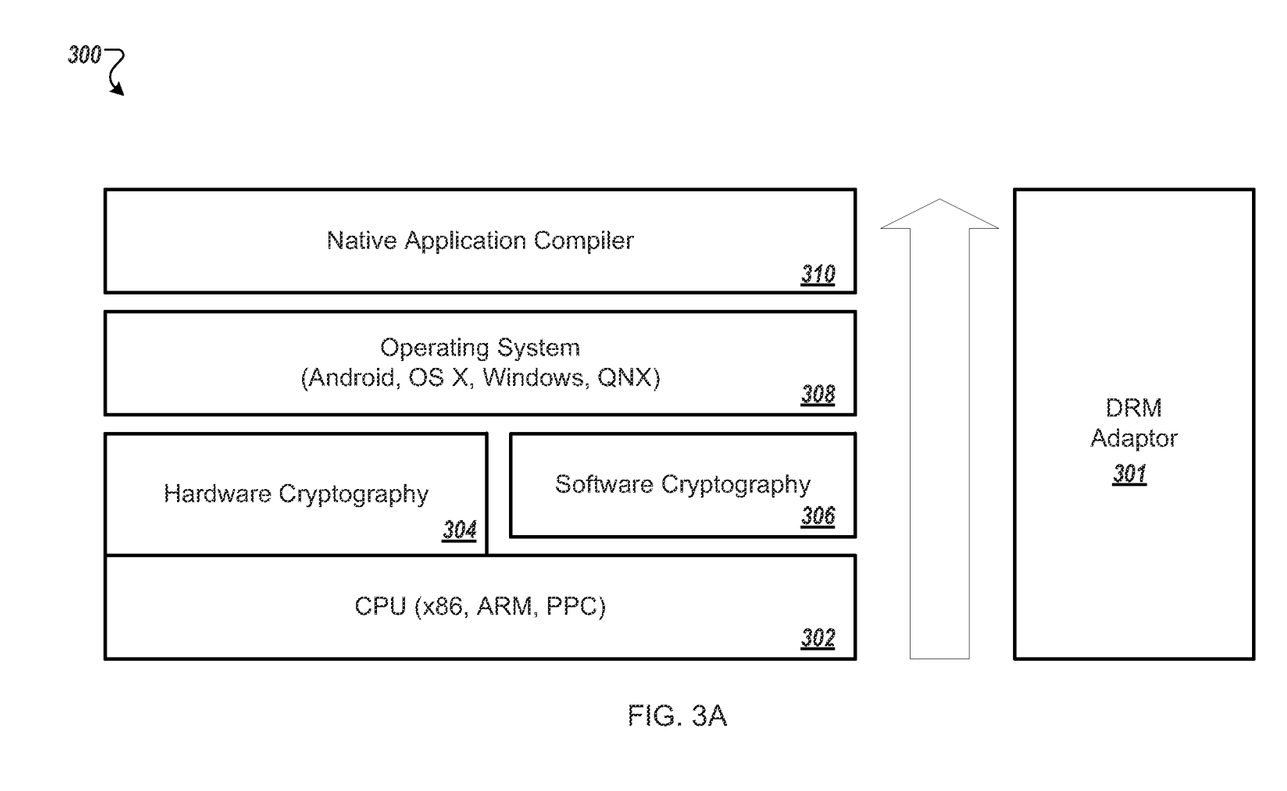
FIGS. 3A and 3B show an architectural framework for a DRM adaptor.
Figure 3B:
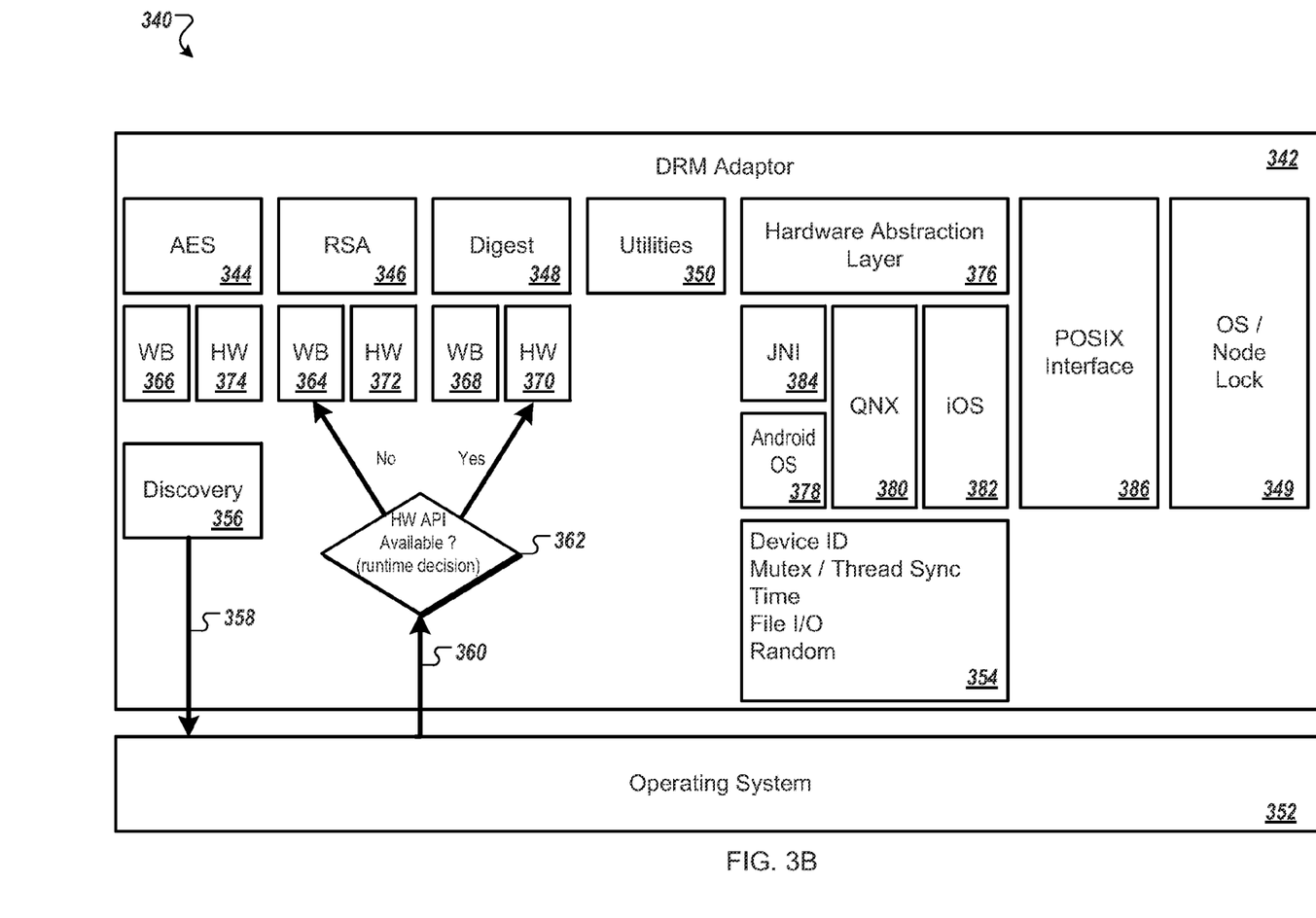

FIGS. 3A and 3B show an architectural framework for a DRM adaptor. FIG. 3A shows a framework 300 for a method for building a DRM adaptor 301. A target CPU (Central Processing Unit) 302 can be identified. For example, the target CPU 302 can be a CPU developed for a personal computer, mobile device, set-top device, tablet computer, gaming console, or some other device.

It can be determined whether the target CPU 302 includes hardware cryptographic capability (e.g., as represented by hardware cryptography 304). If the target CPU 302 includes hardware cryptographic capability, a software provider can work with the vendor of the target CPU 302 to create a discovery API to implement secure, dynamic device profiling to determine, at run time, if the hardware cryptographic capability is available. If it is determined that the target CPU 302 does not include hardware cryptographic capability, it can be determined to develop one or more software cryptographic utilities 306.

A target operating system 308 can be identified. The target operating system 308 can be specific to the target CPU 302 (e.g., such as an operating system developed by a vertical device manufacturer) or the target operating system 308 can be an operating system that is usable on different hardware platforms.

A target compiler 310 can be identified. The target compiler 310 can be a compiler configured to generate code that is runnable by the target operating system 308 on the target CPU 302. The target compiler 310 can be used to build the software cryptography utilities 306, where the software cryptographic utilities 306 are based on the target CPU 302, the target operating system 308, and the target compiler 310. The target compiler 310 can also be used when building the DRM adaptor 301.

FIG. 3B shows an architectural framework 340 for a DRM adaptor 342. The DRM adaptor 342 can include various DRM-related functionality. For example, an AES (Advanced Encryption Standard) component 344 can include functionality related to symmetric-key encryption, an RSA (Rivest, Shamir, and Adleman) component 346 can include functionality related to the RSA cryptography algorithm, and a digest component 348 can include functionality related to cryptographic hash functions. An OS/node lock component 349 can include functionality to protect against an attack related to a user emulating a computing platform on top of a different computing platform used by a computer device.

A utilities component 350 can include custom implementations of system utilities that can interface with an operating system 352 that the DRM adaptor 342 can communicate with. The utilities component 350 can include, for example, custom implementations for operations such as requesting a memory storage area, copying information to memory, deleting information from memory, or comparing information in one memory location to information in another memory location. The utilities component 350 can be provided to protect against security threats that may exist if standard implementations of these functions were used.

The implementation of functionality of the DRM adaptor 342 (e.g., implementations of the AES component 344, the RSA component 346, the digest component 348, and other components) can be based on functionality included in a component 354, where the component 354 may include, for example, functionality related to device identifiers, thread synchronization, mutual exclusion processing, time, file input and output, and random number generation, to name a few examples.

A discovery component 356 can be used to determine, at runtime, whether hardware cryptographic APIs are available to the DRM adaptor 342. For example, the discovery component 356 can send a message 358 to the operating system 352, such as inquiring about the existence of a dynamic library that may support a cryptographic program interface. Based on a response 360 received from the operating system 352, the discovery API 356 can determine whether hardware cryptographic functionality is available.

If hardware cryptographic functionality is not available, the DRM adaptor 342 can use a "white-box" software-based encryption element 364. The white-box software-based encryption element 364 may, for example, be a library specific to a the operating system 352, a current hardware processor, and a specific compiler used to build the library. The DRM adaptor 342 may be capable of using other white-box software encryption elements (e.g., 366, 368) that are associated with other computing platforms. For example, each white-box software-based encryption element 364-368 may be a library which includes source code that is specific to a particular computing platform.

If hardware cryptographic functionality is available, a hardware-based encryption element may be used for cryptographic utilities calls into the DRM adaptor 342. A hardware abstraction layer 376, which may be included in the DRM adaptor 342 or may be separate from the DRM adaptor 342, may include hardware hooks 370 which may include logic specific to interacting with a particular hardware processor. The hardware abstraction layer 376 can include other hardware hooks (e.g., 372, 374) specific to interacting with other hardware processors.

In general, the hardware abstraction layer 376 can include specific details about particular computing platforms, such as particular hardware processors or particular operating systems. The hardware abstraction layer 376 can hide, from the DRM adaptor 342, functionality 378 specific to the Android™ operating system, functionality 380 specific to the QNX operating system, and functionality 382 specific to the iOS operating system, to name a few examples. The hardware abstraction layer 376 can include functionality used to interface with two or more operating systems. For example, a JNI (Java Native Interface) component 384 may be used in conjunction with the functionality 378 related to the Android™ operating system and to other functionality related to other operating systems.

The hardware abstraction layer 376 allows for the functionality of the DRM adaptor 342 to be cross-platform, meaning the DRM adaptor 342 can be used on multiple computing platforms. APIs 386 provided by the DRM adaptor 342 can be provided in a POSIX (Portable Operating System Interface for Unix) compliant format, meaning that the APIs 386 can be used in any environment that is compatible with the POSIX standard.

Figure 4:
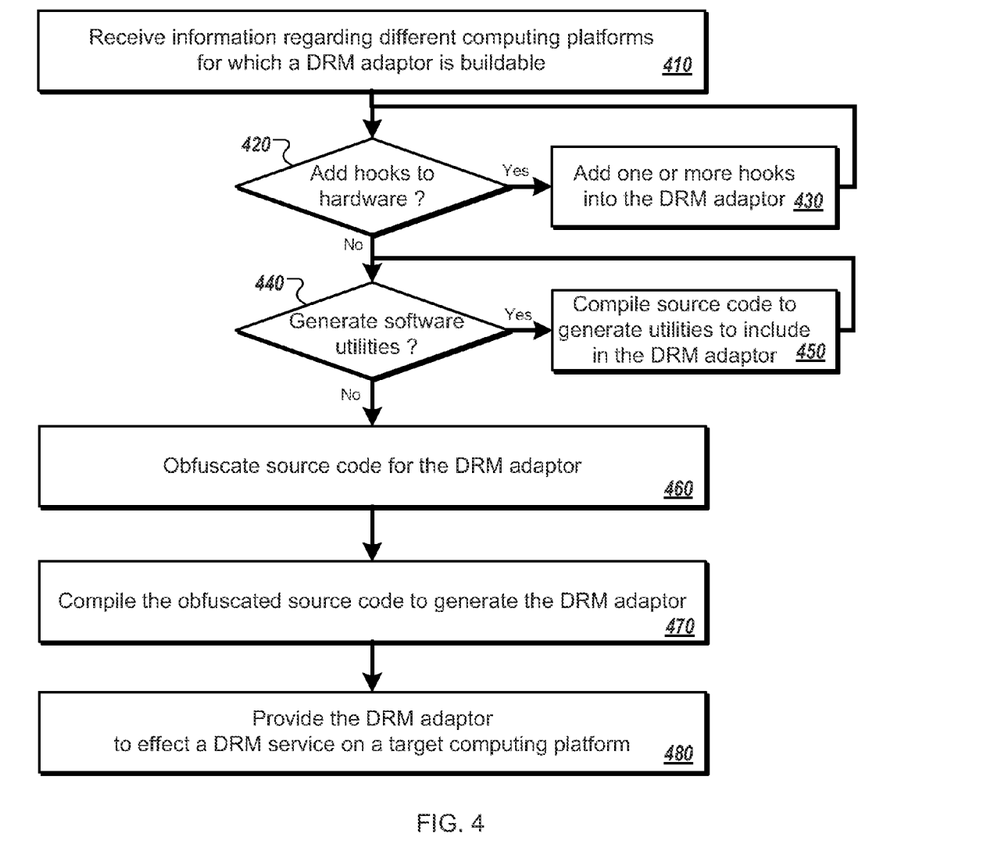
FIG. 4 shows a flowchart of a process of creating a DRM adaptor.

FIG. 4 shows a flowchart of a process of creating a DRM adaptor. Information regarding different computing platforms for which the DRM adaptor is buildable is received 410. For example, for each computing platform for which the DRM adaptor is buildable, a hardware processor, an operating system, and a compiler capable of generating code to run on the hardware processor can be identified.

If one or more of the identified hardware processors has a hardware-based encryption element, it can be determined 420 to add one or more hooks 430 into the DRM adaptor, to call into one or more programming interfaces of a hardware cryptographic capability of an identified hardware processor. The hardware cryptographic capability can include one of multiple, different sets of cryptographic utilities accessible by the DRM adaptor. If multiple identified hardware processors have a hardware-based encryption element, it can be determined 420 to add respective, different sets of one or more hooks into the DRM adaptor to call into respective programming interfaces of different hardware cryptographic capabilities of multiple, different identified hardware processors.

If no identified hardware processors have a hardware-based encryption element, or if respective different sets of one or more hooks have been added into the DRM adaptor for each hardware processor that includes a hardware encryption element, it can be determined 440 to compile 450 source code to generate a set of cryptographic utilities to include in the DRM adaptor. For example, the set of cryptographic utilities can be a software-based encryption element that is included in the DRM adaptor. The source code for the software-based encryption element can be source code that is different from and in addition to source code for the DRM adaptor. The source code for the software-based encryption element can be obfuscated before compilation.

In some implementations, a software-based encryption element is generated for an identified hardware processor, an identified operating system, and an identified compiler if the identified hardware processor does not have a hardware-based encryption element. In some implementations, a software-based encryption element is generated for multiple identified hardware processor, operating system, and compiler combinations regardless of whether a respective hardware processor includes a hardware-based encryption element. It can be determined 440 to compile 450 the additional source code multiple times for different computing platforms, based on an identified operating system, an identified hardware processor, and an identified compiler, for each respective computing platform for which the DRM adaptor is buildable, to generate multiple, different sets of cryptographic utilities to include in the DRM adaptor.

If no or no more software-based encryption elements are to be generated 440, source code for the DRM adaptor is obfuscated 460. The source code for the DRM adaptor can be usable for each of the different computing platforms for which the DRM adaptor is buildable. The source code for the DRM adaptor can include code that implements encryption key handling guidelines for a DRM service. For example, the source code for the DRM adaptor can implement secure key storage and protection against hacking and subversion. The obfuscation can be manual or can be performed using an obfuscation tool.

The obfuscated source code is compiled 470 to generate the DRM adaptor. The generated DRM adaptor can access different sets of cryptographic utilities on multiple, different computing platforms for which the DRM adaptor is buildable. The DRM adaptor is provided 480 to effect a DRM service on a target computing platform. For example, a device vendor can provide the DRM adaptor on the target computing platform, to enable application developers to create applications that implement secure and robust DRM.

Figure 5:
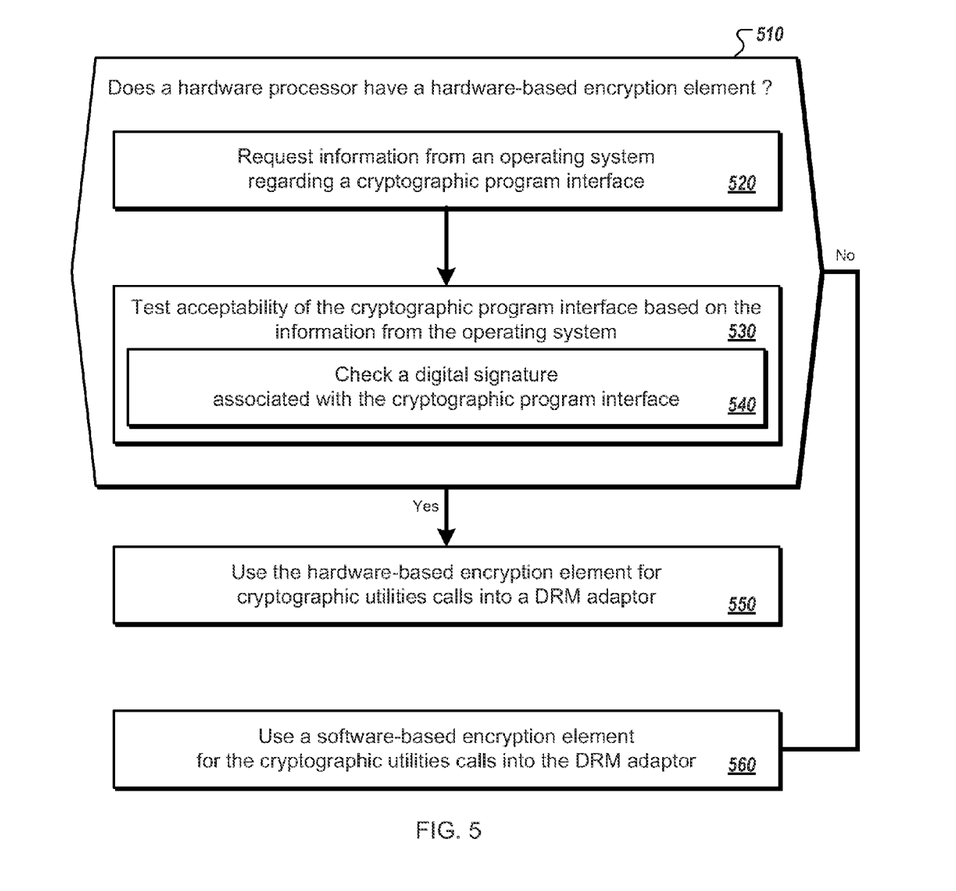
FIG. 5 shows a flowchart of a process of using a DRM adaptor.

FIG. 5 shows a flowchart of a process of using a DRM adaptor. A check is performed 510 to determine whether a hardware processor has a hardware-based encryption element. The check can be performed, for example, upon first use or access of the DRM adaptor. The check may be performed, for example, by a discovery API that is a part of or that is associated with the DRM adaptor.

In some implementations, for example, the checking 510 can include requesting 520 information from an operating system regarding the existence of a cryptographic program interface. For example, the discovery API can request information about the existence of a dynamic library that supports a cryptographic program interface provided by the hardware processor.

Acceptability of the cryptographic program interface can be tested 530 based on the information from the operating system. For example, the testing 530 can include checking 540 a digital signature associated with the cryptographic program interface. For example, the discovery API can compare a digital signature of a library file against an expected digital signature.

As another example, the checking 510 may include sending one or more predetermined messages to the hardware processor. The messages can include one or more challenge-response messages. The determination of whether the hardware processor has a hardware-based encryption element can be based on responses received (or not received) from the hardware processor. The discovery API may, for example, request the hardware processor to encrypt a message and may compare the message encrypted by the hardware processor to an expected digital signature or may examine a digital certificate returned by the hardware processor. The discovery API can perform, for example, the handshake processing described above with reference to arrow 157 (FIG. 1), or can perform another handshake or verification process.

If the hardware processor has a hardware-based encryption element 510, the DRM adaptor uses 550 the hardware-based encryption element for cryptographic utilities calls into the DRM adaptor. Cryptographic utilities calls may be received, for example, from an application that uses the DRM adaptor.

If the hardware processor does not have a hardware-based encryption element 510, the DRM adaptor uses 560 a software-based encryption element for the cryptographic utilities calls into the DRM adaptor. The software-based encryption element can include code compiled from source code for the hardware processor. The source code can be prepared for different computer platforms, can be obfuscated before compilation, either manually or using an obfuscation tool, and can include multiple, different libraries, where each library is specific to a particular computing platform.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a hardware processor;
    one or more memory devices coupled with the hardware processor and effecting an operating system for the hardware processor; and
    a digital rights management (DRM) adaptor configured to check whether the hardware processor has a hardware-based encryption element by requesting information from the operating system regarding a dynamic library that supports a cryptographic program interface provided by the hardware processor, and testing acceptability of the cryptographic program interface by comparing a digital signature of the cryptographic program interface to an expected digital signature, use the hardware-based encryption element for cryptographic calls into the DRM adapter if available, and use a software-based encryption element if the hardware-based encryption element is not available, the software-based encryption element comprising code compiled from source code for the hardware processor, the source code prepared for different computer platforms.

2. The system of claim 1, wherein the DRM adaptor is further configured to test acceptability of the cryptographic program interface by initiating a handshake with a loadable module using a number that is encrypted a first time, decrypted, modified, encrypted a second time using a different key from the first time, decrypted, and unmodified to produce a result comparable to the number.

3. The system of claim 1, wherein the source code comprises source code that was obfuscated before compilation.

4. The method of claim 3, wherein the source code comprises different libraries specific to the different computer platforms.

5. The system of claim 1, wherein the DRM adaptor is configured to: be built into the operating system, execute on top of the operating system, or execute in a runtime environment that enables the DRM adaptor to access functions provided by the operating system.

6. A computer storage medium comprising instructions stored thereon that, responsive to execution by a data processing apparatus, cause the data processing apparatus to perform operations comprising:
- checking whether a hardware processor has a hardware-based encryption element by requesting information from an operating system regarding a dynamic library that supports a cryptographic program interface provided by the hardware processor, and testing acceptability of the cryptographic program interface by comparing a digital signature of the cryptographic program interface to an expected digital signature;
- using the hardware-based encryption element, if available, for cryptographic utilities calls into a digital rights management (DRM) adaptor; and
- using a software-based encryption element, if the hardware-based encryption element is not available, for the cryptographic utilities calls into the DRM adaptor, the software-based encryption element comprising code compiled from source code for the hardware processor, the source code prepared for different computer platforms.

7. The computer storage medium of claim 6, wherein the testing comprises initiating a handshake with a loadable module using a number that is encrypted a first time, decrypted, modified, encrypted a second time using a different key from the first time, decrypted, and unmodified to produce a result comparable to the number.

8. The computer storage medium of claim 6, wherein the source code comprises source code that was obfuscated before compilation.

9. The computer storage medium of claim 8, wherein the source code comprises different libraries specific to the different computer platforms.

10. The computer storage medium of claim 6, wherein the DRM adaptor is configured to: be built into the operating system, execute on top of the operating system, or execute in a runtime environment that enables the DRM adaptor to access functions provided by the operating system.

11. A method comprising:
- checking whether a hardware processor has a hardware-based encryption element by requesting information from an operating system regarding a dynamic library that supports a cryptographic program interface provided by the hardware processor, and testing acceptability of the cryptographic program interface by comparing a digital signature of the cryptographic program interface to an expected digital signature;
- using the hardware-based encryption element, if available, for cryptographic utilities calls into a digital rights management (DRM) adaptor; and
- using a software-based encryption element, if the hardware-based encryption element is not available, for the cryptographic utilities calls into the DRM adaptor, the software-based encryption element comprising code compiled from source code for the hardware processor, the source code prepared for different computer platforms.

12. The method of claim 11, wherein the testing acceptability further comprises initiating a handshake with a loadable module using a number that is encrypted a first time, decrypted, modified, encrypted a second time using a different key from the first time, decrypted, and unmodified to produce a result comparable to the number.

13. The method of claim 11, wherein the source code comprises source code that was obfuscated before compilation.

14. The method of claim 13, wherein the source code comprises different libraries specific to the different computer platforms.

15. The method of claim 11, wherein the DRM adaptor is configured to: be built into the operating system, execute on top of the operating system, or execute in a runtime environment that enables the DRM adaptor to access functions provided by the operating system.

* * * * *

UNITED STATES PATENT AND TRADEMARK OFFICE
CERTIFICATE OF CORRECTION

PATENT NO. : 8,516,273 B2
APPLICATION NO. : 13/149758
DATED : August 20, 2013
INVENTOR(S) : Shyam Vijay et al.

It is certified that error appears in the above-identified patent and that said Letters Patent is hereby corrected as shown below:

On the Title Page, Item (73) ASSIGNEE, delete "Asobe" and insert -- Adobe --, therefor.

Signed and Sealed this
Fifth Day of November, 2013

Teresa Stanek Rea
*Deputy Director of the United States Patent and Trademark Office*